2,933,469

PROCESS FOR PREPARING STABLE MIXED DISPERSIONS OF ELASTOMERS WITH VOLATILE WATER-IMMISCIBLE ORGANIC LIQUIDS CONTAINING DESTABILIZING COMPONENTS AND PRODUCTS THEREFROM

Harlan A. Depew, Glendale, Mo.

No Drawing. Application March 24, 1958
Serial No. 723,100

9 Claims. (Cl. 260—29.7)

This invention relates to dispersions of elastomers and refers to the incorporation of materials including that class spoken of as vulcanizing ingredients and pigments, and it refers specifically to latices and prepared dispersions of solid elastomers including reclaimed elastomers.

This application is a continuation-in-part of my copending application, Serial No. 298,637, filed July 12, 1952 and now abandoned, which is a continuation-in-part of my abandoned application, Serial No. 143,335, filed February 9, 1950. Briefly, this invention is directed to a method of adding inorganic and organic materials to the latex. Ordinarily, pigments, sulfur and other vulcanizing ingredients are treated with a dispersing agent, made into a paste with water, and added to the latex. Under these circumstances, a number of difficulties develop. First, the high density materials tend to settle out and cake in the bottom of the container, and it is sometimes difficult to stir them up and disperse them uniformly through the latex. Secondly, the additives may render the latex unstable. This is often noted in the case of zinc oxide and natural latex or magnesium oxide and polymerized chloroprene latex (neoprene). Third, the vulcanizing ingredients including zinc oxide and magnesia in the case of polychloroprene and the zinc oxide, and sulfur in the case of latex requiring these as curatives working with other compounding ingredients including fatty acids and organic accelerators may cure the latex in advance of deposition. Fourthly, the addition of these solid materials may change the viscosity of the latex undesirably.

To overcome these difficulties, I choose a volatile hydrocarbon liquid and first disperse the additives in it.

These additives include organic accelerators, fatty acids, zinc oxide, magnesia, litharge, sulfur, zinc sulfide pigments, white lead, titanium dioxide, and various inerts. A dispersing agent preferably non-ionic is usually added to the hydrocarbon. Liquid fatty acids such as oleic acid and liquid organic accelerators usually dissolve in the hydrocarbon, but most of the additives are powders and have to be ground into the hydrocarbon. A ball mill is suitable for making this paste. Water preferably containing a suitable dispersing agent is then added to this paste with high agitation, and the water first disperses in the hydrocarbon and the paste thickens. After a certain amount of water has been added, the dispersion inverts and the water becomes the continuous phase.

Coarse, low oil absorption pigments, sulfur, and fillers require a minimum of organic hydrocarbon to make the paste. On the other hand, finer particle compounding ingredients require larger amounts of hydrocarbon.

The water dispersion that consists of small drops of hydrocarbon, containing the additives dispersed in them is then mixed with the elastomer emulsion and the objectionable reactivity and instability do not develop. In some cases the paste is dispersed directly into the elastomer emulsion or just before the inversion point of the paste with water.

The dispersion of my invention now contains the tiny particles of the elastomer in Brownian motion and separately contains tiny particles of hydrocarbon in Brownian motion with the additives dispersed in the hydrocarbon.

Since the additives in the hydrocarbon can not come in contact with the elastomer, there is no reaction between the elastomer and the additives.

Several vulcanizing ingredients are required to vulcanize properly some elastomers. For example, sulfur, organic accelerators, and fatty acids are required for the best cure with natural rubber. In this case it may be sufficient to put only one of these ingredients in the hydrocarbon and the others can be added to the water phase. However, the safest and best practice is to put all the curatives in the hydrocarbon and the very best results will be obtained by making separate pastes of the individual curing ingredients and dispersing them separately in water and adding the several emulsions to the latex.

When a layer of the elastomer of my invention is deposited by evaporation, filtration, or coagulation for example, the additives are deposited uniformly in contact with the elastomers, as the water and hydrocarbon are evaporated. In the case of neoprene (polychloroprene), the zinc oxide and magnesia will begin to react, curing it, especially at elevated temperatures. Similarly, in the case of other elastomers vulcanizing ingredients will cure the elastomers and the temperature of the cure will depend on the choice and amount of the curatives and the rate of cure desired.

In the ideal operation of my process, the water forming the continuous phase of my dispersion is relatively pure except for small amounts of a dispersing agent and a pH regulating material.

In the commercial operation of my process I have found that the additives may not be prefectly dispersed in the hydrocarbon. A very small amount of zinc oxide or magnesia may get into the water phase. This zinc oxide renders ammoniacal natural rubber latex unstable and magnesia renders polychloroprene (neoprene) dispersions unstable. Because of this interaction it has been considered impractical to add magnesia to polychloroprene water dispersions much as it is desirable.

I have found that the injurious effects of the small amounts of zinc oxide and magnesia in causing instability can be overcome by adding a chemical material that reacts with the zinc ions and magnesium ions and eliminates or renders them ineffective. In one procedure I add a small amount of hydrogen sulfide or its equivalent to form sulfide ions. These ions react with the relatively few zinc ions and render them inert. The amount of sulfide ion should be a minimum to precipitate the zinc ions.

Similarly, small amounts of soluble phosphates can be added to precipitate or sequester any magnesium and zinc ions. Such soluble phosphate compounds would include phosphoric acid, sodium phosphate, and ammonium phosphate that will form the desired phosphate ion. In the addition of sodium metaphosphate the action is sequestering rather than precipitating.

Sequestering of undesirable ions is also possible through the addition of organic chelating compounds that can neutralize calcium, iron, manganese, copper, and others normally objectionable heavy metal ions.

The elastomer emulsions covered in this invention are both natural and made synthetically. The more important commercial dispersions are natural rubber latex, dispersions of reclaimed rubber, butadiene-styrene copolymer, butadiene-acrylonitrtile copolymer, chloroprene polymers, and in general, rubbery compositions whose films will develop elongations of from 2 to 3% up to the hundreds of percent typical of the ranges of heavily compounded rubber down to lightly compounded rubber.

The proportions of butadiene to styrene and of butadiene to acrylonitrile in the copolymers are not significant as long as the poymers are rubbery in character.

I know of no elastomers including reclaimed rubber that can not be dispersed in water. I have dispersed polydimethyl silicone and vinyl modified silicones in water. In this case the curing is through free radicals, and organic peroxides are dispersed in the hydrocarbon. The water should be removed at low temperature to prevent hydrolysis of the silicone. Polysulfide elastomers (Thiokol) are commercial and in this case lead peroxide is an example of a curative that can be dispersed in the hydrocarbon.

Copolymers of a large amount of an olefin (isobutylene) and a small amount of diolefin (isoprene) are sold as Butyl rubber. These copolymers have been dispersed in water. Curatives and pigments used in natural rubber are dispersed in the hydrocarbon. Polyester rubbers are dispersed and peroxides or isocyanates can be added in the hydrocarbon. Chlorosulfonated polyethylene is an elastomer marketed as "Hypalon." It is usually cured with litharge and magnesia that can be dispersed in the hydrocarbon of my invention and emulsified with the elastomer dispersion.

From the viewpoint of my invention, the most commercially important elastomers are natural rubber and the synthetic rubbery polymers of conjugated dienes, but the invention applies and is useful with elastomers in general as I have shown.

The number of elastomers that can be made into dispersions for the practice of this invention is large.

In addition to the elastomers mentioned, there are some cured with formaldehyde and acid-generating materials and with amines and sulfur and other curatives.

Other elastomers are based on polymers of methyl and ethyl acrylate and copolymers of ethyl acrylate with chloroethyl vinyl ether.

There is no value in naming more elastomers except to mention that these include bromine and fluorine derivatives that develope special properties.

The dispersions of my invention describe a continuous phase of water with a pH as needed and containing materials that will remove any extraneous zinc and magnesium ions. The discontinuous phase consists of elastomer particles and of particles of a volatile hydrocarbon with the vulcanizing ingredients and other additives dispersed in it. For convenience some of the hydrocarbon particles may contain only part of the additives and other particles will contain other additives. This would involve making more than one hydrocarbon paste.

The elastomers used in my invention give flexibility and extension to my product. They are also adhesive to varying degrees. Oxidized elastomers including halogenated elastomers are especially adhesive. Reclaimed rubber because of oxidation, is an example.

Where an adhesive dispersion with additional adhesive properties is desired, an adhesive can be added to the emulsion of this invention. This adhesive can be water soluble or dispersed as particles. Among the adhesives that may be added are rosin (abietic acid), ester gums, polymerized coumarone-indene resins, asphalt, petroleum resins, formaldehyde condensation resins of which I consider resorcinol formaldehyde the most important, protein adhesives including glues, cellulose derivatives, hydrolyzed starch, and silicic acid compositions. The chemistry of the adhesive component is not critical to this invention. The important thing is that the deposited film shall be tacky and adhesive.

By means of my invention a stable adhesive is obtained that can be used to stick two surfaces together. In one desirable form, the curatives operate at room temperature and vulcanize the elastomer forming a union that will not soften in warm storage. In other adhesive compositions a weaker curing system will be chosen and the cure will be carried out at elevated temperatures.

When the elastomer film is formed, the water and the hydrocarbon evaporate since they are both volatile. The evaporation can take place at relatively low temperatures in a current of air and rapidly at an elevated temperature especially with a current of air.

Kerosene is a desirable hydrocarbon with a usual boiling range of from about 170° C. to about 275° C. The best that can be done in identifying the hydrocarbons is to say that they range from $C_{10}$ to $C_{15}$ and may be characterized as paraffinic and naphthenic. The vapor pressure of kerosene mixture at 170° C. is about 255 mm. and at 218° C. is about 760 mm. One advantage of kereosene is a flash point of above 38° C. which is relatively safe. In many cases, a higher volatility will be preferred even though there might be more danger of fire.

A close cut naphtha with a flash point of above 38° C. is desirable for safety in many cases. By the term hydrocarbon, I include modified hydrocarbons such as carbon tetrachloride, B.P. 77° C. and trichloroethylene, B.P. 87° C. The important consideration is that the hydrocarbon material must be volatile and insoluble in water.

The hydrocarbons can be aromatic, alicyclic, and aliphatic and saturated and unsaturated. To insure satisfactory volatility for my invention the boiling points should be between about 25° C. and 300° C.

Some of the hydrocarbons that can be used in my process with their boiling points follow:

|  | B.P., ° C. |
|---|---|
| n-Pentane | 36 |
| n-Heptane | 98 |
| n-Octane | 126 |
| n-Decane | 174 |
| n-Hexadecane | 287 |
| α-n-Amylene | 30 |
| Cetene | 282 |
| Benzene | 80 |
| Toluene | 111 |
| Cumene | 152 |
| Tetralin | 208 |

Additional hydrocarbons within the boiling point range of about 25° C. to 300° C. suitable to my process can be found listed in Kirk-Othmer's "Encyclopedia of Chemical Technology," vol. 7, pages 598–652. Mixture of hydrocarbons is desirable, as has been noted in my use of kerosene.

When low boiling point hydrocarbons are used in the process of my invention, it is often desirable for operational reasons to chill the hydrocarbon and to use closed and even pressure equipment. For cold climates, these low boiling point hydrocarbons can be used with advantage. In warm atmospheres, it is often desirable to choose a hydrocarbon with a flash point of about 38° C. to reduce the hazard of fire and explosion.

To increase the evaporation rate of the hydrocarbon it is often desirable to limit the maximum boiling point of the hydrocarbon to 220° C.

Accordingly in one practice of my invention, the volatile hydrocarbon will have a minimum flash temperature of 38° C. and a maximum boiling point of 220° C. Technically the broader range is operational and will often be chosen.

It is of course obvious that the product of my invention will be stored at a temperature well below that at which the vapor pressure at the hydrocarbon-water interface will exceed atmospheric.

It is obvious that any hydrocarbon that is liquid will meet the low boiling point or high volatility requirements of this invention. The higher boiling point or lower volatility requirement will be met by any hydrocarbon that will evaporate in a stream of gas, an applied vacuum, or simple boiling, when the aqueous rubber dispersion of this invention is deposited in a layer. The temperature of the layer can be adjusted as the particular emulsion makes desirable. Accordingly the expression "a volatile liquid hydrocarbon" fully describes the material used in this process.

As an example of my process, I mixed together the following composition:

A

| | Grams |
|---|---|
| Zinc oxide | 80 |
| Kerosene | 120 |
| Ethofat 142/20 | 20 |
| Arquad 2C | 4 |

This composition easily made a very smooth paste on ball milling. To this paste water was slowly added with agitation. At first, the paste thickened sharply, presumably due to the water dispersing in the kerosene, and then it suddenly became thinner, presumably when the emulsion inverted and the kerosene containing the zinc oxide became the discontinuous phase. From this point on, water incorporated easily.

A rather fluid liquid was obtained when 180 grams of water had been added.

B

| | Grams |
|---|---|
| Zinc oxide | 80 |
| Kerosene | 120 |
| Ethofat 142/20 | 20 |
| Arquad 2C | 4 |
| | 224 |
| Water | 180 |
| Total | 404 |

After a week, this emulsion showed no signs of settling, separation, or any other visible change. 101 grams of this emulsion were added to 325 grams of ammonia-preserved natural rubber latex containing 60–62% of rubber. After 24 hours' standing, it was still fluid, whereas when an equivalent amount of the same grade of zinc oxide in a paste in water was added to the same amount of natural rubber latex, the liquid immediately began to thicken and was solid in a few hours.

The ethofat 142/20 and the Arquad 2C are described in a bulletin by Armour & Co. entitled Ethomeens . . . Ethomids . . . Ethofats. The Ethofat is stated to be "mono-fatty- or resin-acid esters of polyethylene glycols." The Arquad 2C is stated to be an "oil-soluble quaternary ammonium compound." Arquad 2C may be identified as dimethyl dicoco ammonium chloride. The coco refers to long chain hydrocarbons from coconut oil of approximately 12 carbon atoms. The zinc oxide pigment was Azo 55, marketed by the American Zinc Sales Co.

The zinc oxide can be ground into a paste in the volatile liquid hydrocarbon and dispersed in water, the magnesia can be ground in another paste and dispersed, the sulfur in a third, and so on, or the zinc oxide and other ingredients can be ground into one paste and this paste can be dispersed in water.

These compounded emulsions with the zinc oxide and magnesia in an organic liquid may show a very fast "break" (coagulation) under pressure, but they are stable under agitation. I believe that this is due to some of the inorganic material being set free under pressure and furnishing ions that destabilize the elastomer dispersion. Of course, the stability can be increased by the addition of stabilizers if this is desired, but the quick pressure break is very desirable for many purposes, including adhesives.

Magnesia, such as the Maglite M distributed by the C. P. Hall Co., has a very high oil absorption, and considerable volatile liquid hydrocarbon is required to make the paste. It was found that the quaternary ammonium compound reacted with the magnesia and was undesirable since it caused coagulation when mixed with polychloroprene latex. The polychloroprene latex used was Du Pont's type 571 with 50.5% solids. Accordingly, though helpful but not essential with zinc oxide, it was not used with magnesia.

An example of a magnesia dispersion is:

C

| | Grams |
|---|---|
| Magnesia | 80 |
| Kerosene | 240 |
| Ethofat 142/20 | 40 |
| | 360 |

This very smooth paste contained more than the minimum of kerosene. The above paste was dispersed in water.

D

| | Grams |
|---|---|
| Paste (C) | 360 |
| Water | 720 |
| | 1080 |

This emulsion on standing several days formed a thixotropic gel that broke down to a smooth emulsion on gentle stirring. To prevent such thixotropic gelling, occasional mild stirring may be desirable.

Another water paste of zinc oxide and magnesia was made without kerosene.

E

| | Grams |
|---|---|
| Water | 100 |
| ZnO | 25 |
| MgO | 20 |
| | 145 |

Polychloroprene latex was mixed with E.

F

| | Grams |
|---|---|
| Polychloroprene latex | 100 |
| Paste E | 14.5 |
| | 114.5 |

This mixture (F) began to coagulate at once, and the elastomer was largely coagulated in an hour.

Another test with a diluted paste that was much thinner also caused coagulation.

In contrast, when the emulsion D was added to polychloroprene latex, there was no coagulation in several hours of test and the elastomer did not vulcanize.

The following compositions were prepared:

| | G | H | I |
|---|---|---|---|
| Polychloroprene latex | 100 | 100 | 100 |
| Emulsion B | 7.5 | 7.5 | 7.5 |
| Emulsion D | 27 | 27 | 27 |
| Sod. metaphosphate | | 0.1 | 0.1 |
| Sodium sulfide | | | 0.3 |

Larger amounts of emulsions (B) and (D) can be used with advantage in some cases. Compounded latex (G) was made up with both fresh emulsions (B) and (D) and with emulsions two weeks old, and in both cases the severe coagulation noted when paste E was added to polychloroprene latex did not occur, although there was an indication of coagulation after five days. After the same period of time, there was almost no indication of coagulation in (H) containing metaphosphate, and none at all in (I) containing both metaphosphate and sulfide. It is my opinion that these metaphosphate and sulfide materials removed traces of ions that escaped from emulsions (B) and (D).

It is important that not too large an amount of these metal ion neutralizing chemicals be added lest they affect the cure.

Microscopical examination at high magnification of emulsion (I) showed particles in Brownian motion. There were clear centered spherical latex particles and other particles containing tiny dispersed solids. These were the hydrocarbon droplets containing zinc oxide and magnesia pigments, as demonstrated by examination of the individual component emulsions. In general, the magnesia-containing hydrocarbon particles were round, due to the fluidity of the original paste. The particles under bombardment of other particles momentarily lost their round shape and quickly regained it. The little hydrocarbon drops containing zinc oxide were often irregular in shape, due to the stiffness of the paste and perhaps to some thixotropy. Some relatively large particles of zinc oxide were in individual kerosene envelopes.

Thin layers of aged compounded latices (G), (H), and (I) were poured out in flat dishes for evaporation and coagulation. (G) set up first, and (I) remained fluid much longer, with (H) intermediate in set-up time.

The dried sheets of elastomer were vulcanized in an oven by heating one hour at 85° C. (I) was homogeneous and had very high strength and was transparent. (G) showed lower strength and showed opaque areas. (H) was intermediate in appearance with properties between (G) and (I).

The magnesia and zinc oxide ground in kerosene and dispersed with the elastomer latex were effective in curing the elastomer, whether the emulsions were made fresh or were deposited after two weeks' standing.

With sponging agents present, the deposited elastomer sheet can be made porous but the rubber films and sheets that I usually make are firm and dense.

Although many emulsifying agents can be used, I find that the non-ionic emulsifiers in (A) work well but are not essential.

Another example follows:

J

| | Grams |
|---|---|
| Kerosene | 150 |
| Oleic acid | 15 |
| Zinc oxide | 150 |
| 10% ammonia | 60 |
| Water | 120 |
| Sulfur | 75 |
| Piperidinium pentamethylenedithiocarbamate | 30 |
| | 600 |

K

| | |
|---|---|
| Emulsion J | 20 |
| Natural rubber latex (60% centrifuged) | 100 |
| Sodium sulfide | 0.3 |
| Sodium metaphosphate | 0.1 |
| | 120.4 |

Compounded latex (K) was stable for weeks and the film vulcanized at low temperature to give good strength.

An emulsion similar to (K) but with a butadiene-styrene copolymer synthetic latex containing about 40% solids with 46% styrene and 54% butadiene in place of natural rubber was also stable, and cured properly on deposition.

A cumar-rosin emulsion was made with the cumar and rosin melted together before hot dispersion.

L

| | Grams |
|---|---|
| Coumarone-indene resin | 100 |
| Rosin (abietic acid) | 100 |
| Water | 200 |
| Potassium oleate | 10 |
| | 410 |

A good adhesive emulsion that was stable in the can was prepared by mixing.

M

| | Grams |
|---|---|
| Emulsion K | 400 |
| Emulsion L | 100 |
| | 500 |

When emulsion (M) was spread on paper and two pieces pressed together, the emulsion broke and the pieces of paper were united. After a short time at room temperature, the rubber vulcanized and the joint was strong even at elevated temperatures.

This example showed the rosin and coumarone-indene resin added together but either one can be added alone. The coumarone-indene resin used was sold by the tradename Cumar.

Asphalt as a thick black liquid is easily emulsified in water to make a dispersion containing 40% asphalt solids. Higher and lower concentrations are practical. These asphalt dispersions are commercial. As an example 100 g. of this 40% asphalt emulsion are added to 400 g. of emulsion (K). On removal of the water and hydrocarbon, a black composition is obtained.

For maximum adhesiveness a so-called pure asphalt is used but for special purposes, an asphalt emulsion containing clay is used.

Dispersions from elastomers, natural, synthetic, and reclaimed, have long been used to dip tire cord and other fabrics to obtain better adhesion. Later resorcinol formaldehyde was added to improve the adhesion. These dispersions containing resorcinol formaldehyde have been an important item of rubber manufacture. 500 grams of this emulsion fortified with resorcinol formaldehyde and containing around 30–60% of natural rubber as latex are mixed with 60 grams of emulsion (J) to make an improved stable tire cord adhesive. Before my invention, there was a great deal of trouble from the rubber curing on the equipment during tire cord dipping.

Phenol formaldehyde and urea formaldehyde can be used in place of resorcinol formaldehyde but in general the latter is very satisfactory.

As another example, 10 grams of glue as a cold water solution were added to 200 g. of emulsion (I) to give a polychloroprene product of enhanced adhesiveness. In place of the glue, proteins such as casein and dextrin adhesives can be used.

As another example of my invention, I made a paste of $PbO_2$ in n-octane and then dispersed this paste in water.

N

| | Grams |
|---|---|
| $PbO_2$ pigment | 20 |
| n-Octane | 75 |
| Dispersing agent | 5 |
| | 100 |

The dispersing agent used was a mixture of non-ionic esters of polyethylene glycols but many dispersing agents are available for this invention.

Paste (N) is dispersed in water to form a water dispersion.

O

| | Grams |
|---|---|
| Paste N | 100 |
| Water | 200 |
| | 300 |

Water dispersions of polysulfide elastomers are available under the Thiokol tradename containing up to 75% solids.

To 75 grams of dispersion (O), I add 160 grams of

75% solids of the commercial dispersion of the polysulfide elastomer. The dry film contains

P

| | Grams |
|---|---|
| Polysulfide elastomer | 120 |
| PbO₂ pigment | 5 |
| Dispersing agent | 1.25 |
| | 126.25 |

$Pb_3O_4$ is in effect a mixture of $PbO_2$ and $PbO$. It works satisfactorily. The polysulfide elastomer dispersion can be made very well by dispersing one of the liquid polysulfide polymers in water. The thin sheet (P) will cure at room temperature.

The hydrocarbon α-n-amylene can be used in paste (N) in place of n-octane. When this is done, I make the paste and its dispersion, as well as mixing it with the elastomer dispersion, in a room at a temperature of not more than 5° C. and I store the completed polysulfide emulsion at a temperature of not more than 10° C. This is largely for safety reasons. The dispersion can be handled at ordinary room temperatures. This dispersion has a distinct advantage for use in cold climates since the hydrocarbon evaporates more rapidly.

I have also made a dispersion using a higher boiling volatile liquid hydrocarbon, cetene. I first made a paste and then dispersed it in water.

Q

| | Grams |
|---|---|
| Zinc oxide | 100 |
| Magnesia | 80 |
| Cetene | 360 |
| | 540 |
| Water | 1060 |
| | 1600 |

This emulsion was then mixed with polychloroprene latex.

R

| | Grams |
|---|---|
| Polychloroprene latex | 200 |
| Emulsion Q | 80 |
| | 280 |

When emulsion (R) is spread in a thin film, air and other gases can be blown over it to evaporate the water and volatile liquid hydrocarbon. To speed up the evaporation rate the gas can be heated.

In making emulsions such as (Q), I like to use mixtures of hydrocarbons. A desirable mixture is equal parts of n-pentane, n-heptane, toluene, cumene, tetralin, and n-hexadecane.

In all the emulsions of my invention, the evaporation of the water and volatile liquid hydrocarbons can be accelerated by applying a vacuum. When the emulsion is spread on a porous material such as paper, much of the water and hydrocarbon may be absorbed by the porous paper but it ordinarily must be evaporated from the substrate.

A well known volatile liquid hydrocarbon is known as Stoddard solvent A. It is a close cut petroleum fraction that begins to boil at 156° C. and is dry at 200° C. Its flash point is 41° C. and its specific gravity is 0.76. In contrast kerosene has a flash point of about 54° C. and a specific gravity of 0.82. Like kerosene it is not only a desirable volatile liquid hydrocarbon but the individual components of these composite materials are individually suitable for use in my invention.

The following paste can be made and dispersed in water.

S

| | Grams |
|---|---|
| Stoddard solvent A | 150 |
| Dispersing agent | 15 |
| Zinc oxide | 150 |
| Sulfur | 75 |
| Organic accelerator | 30 |
| Whiting pigment | 200 |
| | 620 |
| Water | 1380 |
| | 2000 |

T

| | Grams |
|---|---|
| Emulsion S | 400 |
| Butadiene-styrene copolymer latex (50% solids) | 1000 |
| Sodium sulfide | 3 |
| Sodium metaphosphate | 1 |
| Organic chelating agent | 2 |
| | 1406 |

The dispersing agent is preferably non-ionic for convenience but others can be used. The chelating agent is a compound that will remove zinc ions. These are generally nitrogen-containing materials. A material of this general type is given in example (T). The organic accelerator can be an aldehyde amine, a guanidine, a carbon bisulfide accelerator, and mixtures of these. The choice of all these materials is routine for those experienced in this field.

My process is a physical-chemical process. It consists in making emulsions with the reactive ingredients uniformly mixed together and yet kept separate so that no reaction occurs until the components are coalesced by any well known means such as evaporation of the water and hydrocarbon, by coagulation, and by methods well known to those skilled in the art, such as electrodeposition.

The hydrocarbon is one that is liquid at the temperature of making the paste and the emulsion. This temperature can be well above ordinary room temperature. A hydrocarbon insoluble in water is chosen so that an emulsion can be made. The volatility of the hydrocarbon can cover a broad range and the rate of evaporation after coalescence is influenced by the temperature, by the water and by the gases including air passing over the drying mixture.

It is obvious that modified hydrocarbons containing other elements than carbon and hydrogen are included in my term hydrocarbon as long as they are insoluble in water and volatile in the sense of this disclosure.

My invention applies to elastomers in general; their chemistry makes little difference except that proper vulcanizing ingredients must be used as is evident to rubber technologists who will apply this invention.

The adhesives can be of a wide chemical variety, for the chemistry is unimportant. They must only make the film tacky and give proper adhesion.

My invention is broad; it is impossible to list all the elastomers, hydrocarbons, vulcanizing ingredients, and adhesives that may be used. Those materials listed are given as examples of the many components of my invention.

Having thus described the invention, what is claimed and desired to be secured by Letters Patent is:

1. The improvement in the process for making aqueous rubbery dispersions which consists in adding to a latex containing a rubber selected from the group consisting of natural rubber and synthetic rubbery polymers of conjugated dienes, an aqueous emulsion prepared by dispersing vulcanizing ingredients in a liquid hydrocarbon with a boiling point in the range of about 25° C. to about 300° C. and subsequently adding water to the hydrocarbon dispersion to form the emulsion.

2. An aqueous rubbery dispersion prepared by the process of claim 1.

3. The improvement in the process for making aqueous rubbery dispersions which consists in adding to a natural rubber latex, an aqueous emulsion prepared by dispersing vulcanizing ingredients in a liquid hydrocarbon with a boiling point in the range of about 25° to about 300° C. and subsequently adding water to the hydrocarbon dispersion to form the emulsion.

4. The improvement in the process for making aqueous rubbery dispersions that consists in adding to natural rubber latex an aqueous emulsion prepared by dispersing zinc oxide pigment in a liquid hydrocarbon with a boiling point in the range of about 25° C. to about 300° C. and subsequently adding water to the hydrocarbon dispersion to form the emulsion.

5. The improvement in the process for making aqueous rubbery dispersions which consists in adding to a water dispersion of reclaimed rubber, an aqueous emulsion prepared by dispersing vulcanizing ingredients in a liquid hydrocarbon with a boiling point in the range of about 25° C. to about 300° C. and subsequently adding water to the hydrocarbon dispersion to form the emulsion.

6. The improvement in the process for making aqueous rubbery dispersions that consists in adding to a polychloroprene latex an aqueous emulsion prepared by dispersing vulcanizing ingredients in a liquid hydrocarbon with a boiling point in the range of about 25° C. to about 300° C. and subsequently adding water to the hydrocarbon dispersion to form the emulsion.

7. The improvement in the process for making aqueous rubbery dispersions that consists in adding to a polychloroprene latex an aqueous emulsion prepared by dispersing powdered magnesia in a liquid hydrocarbon with a boiling point in the range of about 25° C. to about 300° C. and subsequently adding water to the hydrocarbon dispersion to form the emulsion.

8. The improvement in the process for making aqueous rubbery dispersions that consists in adding to a water dispersion of a rubbery butadiene-styrene copolymer, an aqueous emulsion prepared by dispersing the vulcanizing ingredients in a liquid hydrocarbon with a boiling range of about 25° C. to about 300° C. and subsequently adding water to the hydrocarbon dispersion to form the emulsion.

9. The improvement in the process for making aqueous rubbery dispersions that consists in adding to a water dispersion of a rubbery butadiene-acrylonitrile copolymer, an aqueous emulsion prepared by dispersing the vulcanizing ingredients in a liquid hydrocarbon with a boiling range of about 25° C. to about 300° C. and subsequently adding water to the hydrocarbon dispersion to form the emulsion.

References Cited in the file of this patent

UNITED STATES PATENTS

| | | |
|---|---|---|
| 2,234,211 | Walker | Mar. 11, 1941 |
| 2,477,015 | Sturgis | July 26, 1949 |

FOREIGN PATENTS

| | | |
|---|---|---|
| 482,677 | Great Britain | Apr. 4, 1938 |